US012792084B2

(12) United States Patent
Madakasira et al.

(10) Patent No.: US 12,792,084 B2
(45) Date of Patent: Nov. 10, 2026

(54) ACCURATE TIMESTAMP OR DERIVED COUNTER VALUE GENERATION ON A COMPLEX CPU

(71) Applicant: Microsoft Technology Licensing, LLC, Redmond, WA (US)

(72) Inventors: Sarath Madakasira, Bothell, WA (US); Keith Loren Mange, Beaux Arts, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 163 days.

(21) Appl. No.: 18/392,860

(22) Filed: Dec. 21, 2023

(65) Prior Publication Data

US 2024/0402757 A1 Dec. 5, 2024

Related U.S. Application Data

(62) Division of application No. 17/121,340, filed on Dec. 14, 2020, now Pat. No. 11,880,231.

(51) Int. Cl.

| | |
|---|---|
| ***G06F 1/14*** | (2006.01) |
| ***G06F 1/3287*** | (2019.01) |
| ***G06F 9/38*** | (2018.01) |

(52) U.S. Cl.

CPC .............. *G06F 1/14* (2013.01); *G06F 1/3287* (2013.01); *G06F 9/3869* (2013.01)

(58) Field of Classification Search

CPC ........................................................ G06F 1/12

See application file for complete search history.

(56) References Cited

U.S. PATENT DOCUMENTS 5,233,694 A * 8/1993 Hotta .................... G06F 9/3824 712/E9.05

7,987,347 B2 * 7/2011 Wilson .................... G06F 9/325 712/241

(Continued)

FOREIGN PATENT DOCUMENTS

CN 104854556 A 8/2015

OTHER PUBLICATIONS

First Office Action received for Chinese Application No. 202180084051.5, mailed on Apr. 26, 2026, 14 Pages (English Translation Provided).

(Continued)

*Primary Examiner* — Phil K Nguyen

(57) ABSTRACT

Timekeeping on a computing device is deterministically performed by implementing two successive calls to a time function that returns current time based on a continuously running counter that is maintained in one or more cores of the device's CPU. The same fixed time computation parameters are used in each call, with the single variable being a value that is read from the counter. For the initial call to the time function, the processor optimizes the instruction execution by predicting the function's execution path based on observed patterns. As the instructions and data are already cached, and the processor has the results of the prior execution path prediction, the subsequent call executes quickly and predictably relative to the initial call while the processor remains in a working (i.e., non-sleep) state. The series of calls provides a deterministic time computation with improved accuracy by mitigating the unpredictability of processor sleep state delays.

20 Claims, 14 Drawing Sheets

(56) References Cited

U.S. PATENT DOCUMENTS

| | | | | |
|---|---|---|---|---|
| 8,719,556 | B2 | 5/2014 | Mendes | |
| 8,850,394 | B2 | 9/2014 | Edwards | |
| 9,645,837 | B2 * | 5/2017 | Anyuru | G06F 9/4552 |
| 11,157,348 | B1 * | 10/2021 | Qian | G06F 11/0769 |
| 2008/0046702 | A1 * | 2/2008 | Morrow | G06F 9/3804<br>712/238 |
| 2009/0240889 | A1 * | 9/2009 | Choy | G06F 12/0815<br>711/E12.024 |
| 2012/0102269 | A1 * | 4/2012 | Ono | G06F 12/0862<br>711/E12.024 |
| 2019/0041950 | A1 * | 2/2019 | Chynoweth | G06F 1/3243 |
| 2019/0121689 | A1 * | 4/2019 | Jeyapaul | G06F 11/0727 |

OTHER PUBLICATIONS

First Examination Report Received for Indian Application No. 202317040007, mailed on Jul. 16, 2026, 10 Pages.

* cited by examiner

ACCURATE TIMESTAMP OR DERIVED COUNTER VALUE GENERATION ON A COMPLEX CPU

CROSS REFERENCE TO RELATED APPLICATION

This application is a divisional of U.S. patent application Ser. No. 17/121,340, filed on Dec. 14, 2020, entitled "Accurate Timestamp or Derived Counter Value Generation on a Complex CPU", the contents of which are incorporated by reference in its entirety.

BACKGROUND

An operating system (OS) or BIOS (basic input/output system) may take power-saving measures, such as moving the CPU from a working state to a sleep state, on central processing units (CPUs). Such measures can result in unpredictable execution of time functions and cause timestamps to be generated with low resolution.

SUMMARY

Highly accurate timekeeping on a computing device is deterministically performed by implementing two successive calls to a time function that returns a current time based on a continuously running counter that is maintained in one or more cores of the computing device's CPU. The same fixed time computation parameters are used in each call, with the single variable being a value that is read from the counter. Each function call causes instructions to be loaded into a processor pipeline and associated data to be cached. Execution of the time function can trigger non-trivial execution branching which can result in the processor entering a sleep state while waiting on an operation. The amount of time taken to execute the function can therefore be unpredictable. For the initial call to the time function, the processor optimizes the instruction execution by predicting the function's execution path based on observed patterns. As the instructions and data are already cached, and the processor has the results of the prior execution path prediction, the subsequent call executes quickly and predictably relative to the initial call while the processor remains in a working state (i.e., without entering a sleep state). Compared to conventional techniques that generate low-resolution timestamps which capture a value that was determined at some randomly indeterminate time in the past, the successive calls provide a deterministic time computation with improved accuracy by mitigating the unpredictability of processor sleep state delays.

Advantageously, the present timekeeping technique can retrieve a current value of the running counter with high resolution to measure time intervals or provide, for example, accurate timestamps or other values that are derived from the counter. Such timestamps and derived counter values may be used in a diverse range of scenarios in which accuracy within one to two microseconds is desired. For example, cloud computing, robotic, industrial, financial, and communication systems can benefit from highly precise timekeeping that may improve operation performance and efficiency, precisely synchronize activities across distributed resources, and reduce security vulnerabilities of the underlying computing infrastructure.

The present timekeeping techniques may be implemented across processor types and configurations (including complex CPUs) without requiring modifications to BIOS (basic input/output system) settings on a computing device. Such compatibility can reduce the time needed to configure computing devices to gain the benefits of accurate timekeeping which may be particularly advantageous, for example, in distributed and cloud computing environments in which computer servers are deployed at scale while needing to work together synchronously. The present timekeeping techniques may be implemented as an operating system feature and/or be exposed to applications or be incorporated therein.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

Like reference numerals indicate like elements in the drawings. Elements are not drawn to scale unless otherwise indicated.

DETAILED DESCRIPTION

Figure 1:
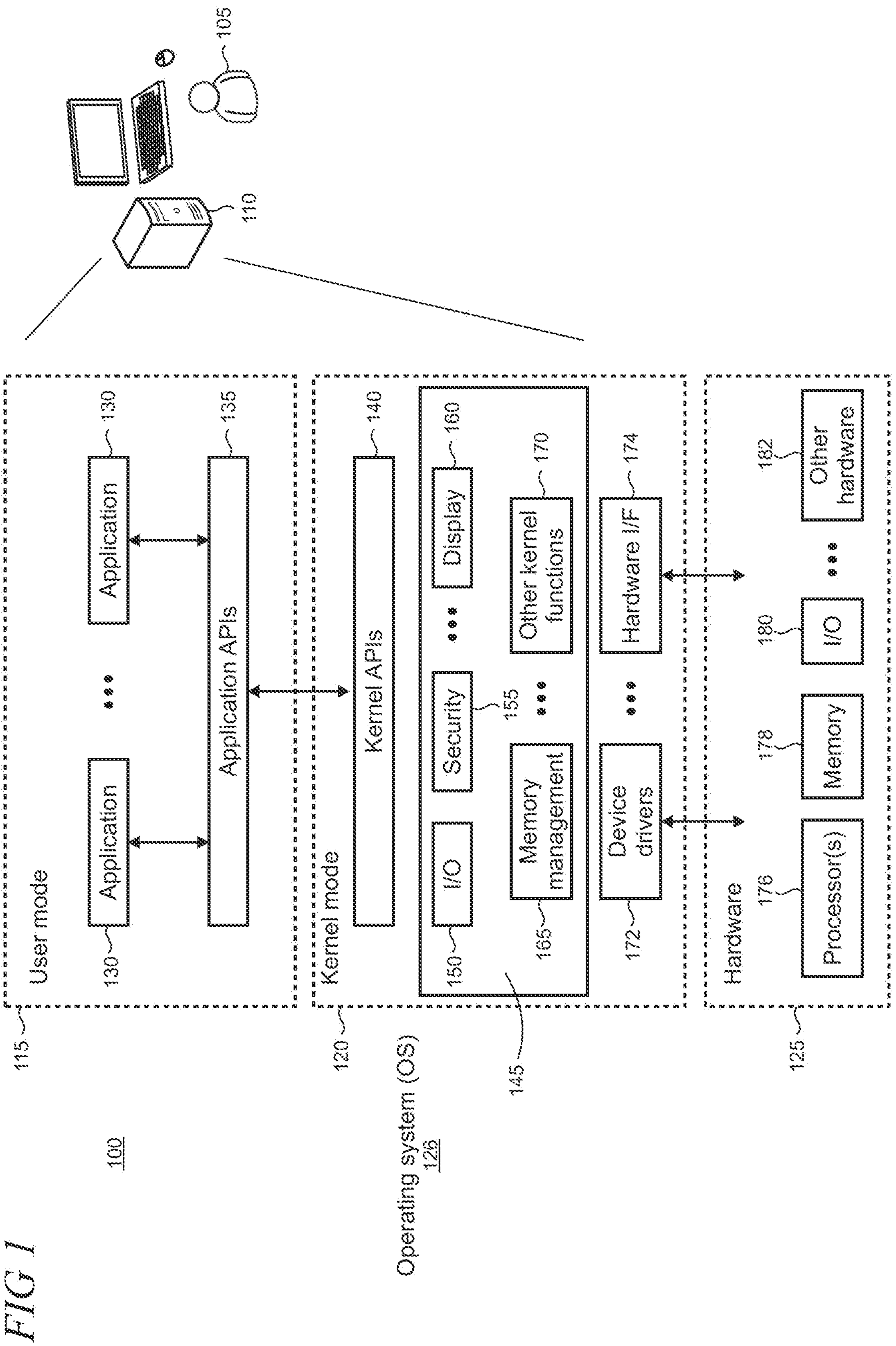
FIG. 1 shows an illustrative computing architecture.

FIG. 1 shows an illustrative computing architecture 100 that operates on a computing device 110 that is employed by a user 105. The architecture is layered and includes a user mode 115, a kernel mode 120, and a hardware layer 125. The user mode includes applications 130 and a set of application programming interfaces (APIs) 135 with which the applications communicate. The kernel mode is typically instantiated as part of the kernel of an operating system (OS) 126 that operates on the computing device. The kernel includes kernel APIs 140 that arbitrate access to the kernel functions as well as various kernel functions 145, such as I/O (input/output) 150, security 155, display control 160 (e.g., access a display or monitor), memory management 165, and other privileged/kernel functions 170. The kernel typically is configured to have sole access to hardware in the hardware layer 125 via device drivers 172 and other hardware interfaces (I/Fs) 174.

The hardware layer 125 is below the kernel mode 120 and includes the hardware of the computing device 110. For example, the hardware includes one or more processor(s) 176, memory 178, I/O 180, other hardware 182, etc. In this illustrative example, the processor operates as a load-store processor under a RISC (reduced instruction set computing) architecture or other suitable ISA (instruction set architecture). In alternative implementations, the processor may be configured to utilize a CISC (complex instruction set computing) architecture.

Each processor may be configured with one or more cores. Each core typically comprises a plurality of arithmetic logic units (ALUs) and associated registers and controllers (not shown in FIG. 1). For the sake of clarity in exposition, the term "processor" is used in the description below and drawings to collectively refer to one or more CPUs and/or one or more processor cores unless the specific usage of the term and/or context indicates otherwise.

Figure 2:
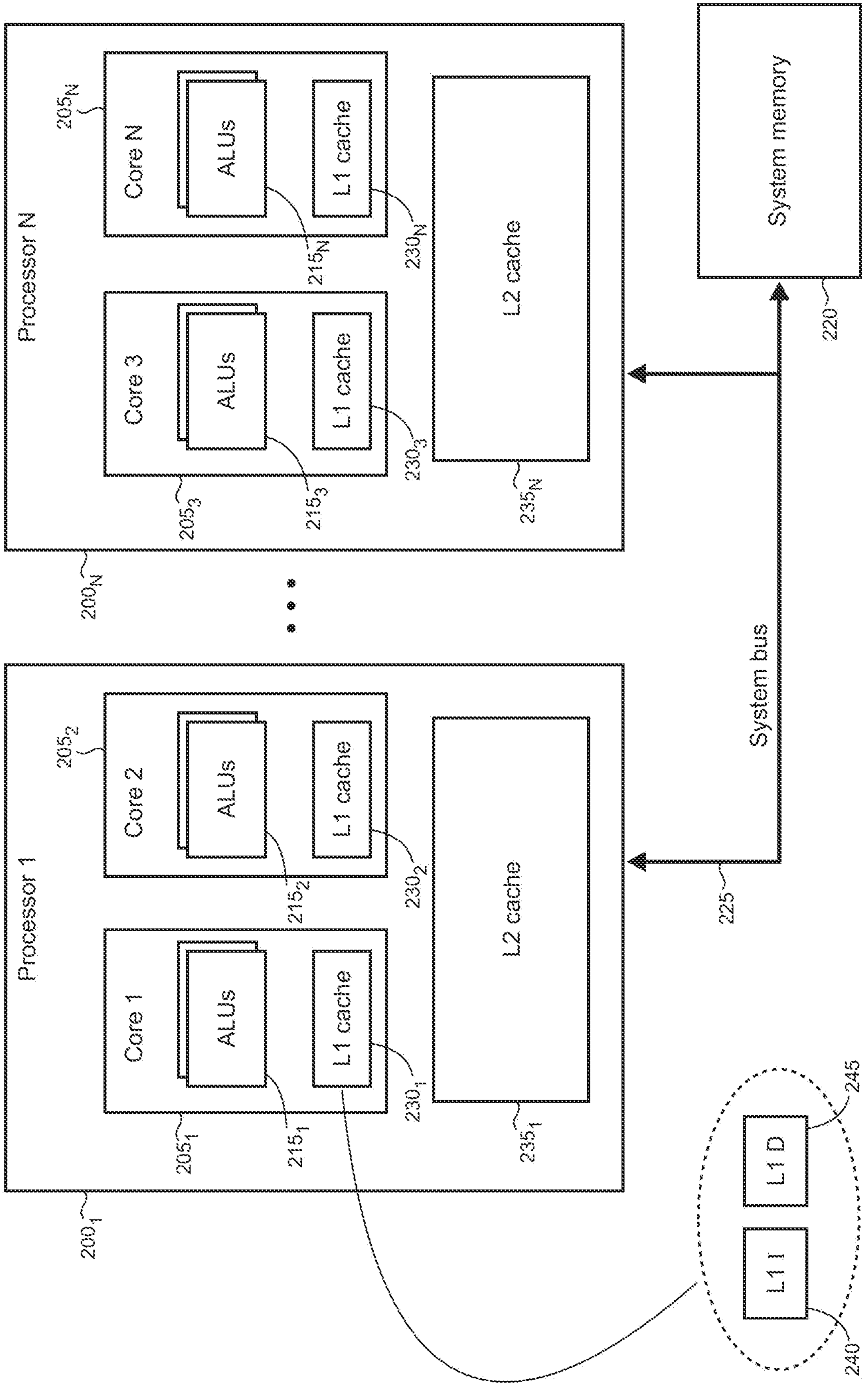
FIG. 2 shows details of illustrative processors having multiple cores in a computing device.

FIG. 2 shows an illustrative arrangement in which multiple processors 200 each utilize multiple cores 205 having a plurality of ALUs 215. The processors may be operatively coupled to system memory 220 over a system bus 225. A level 1 (L1) cache 230 is associated with each core and a level 2 (L2) cache 235 is shared by the cores in each processor, as shown. Other caches of different levels and types may also be utilized in a given processor (not shown), such as a translation lookaside buffer (TLB) and L3 or L4 caches.

The caches 230 and 235 are implemented in hardware and are typically configured using smaller and faster memory that is located physically close to the processor to store copies of data from the system memory that is frequently used. In this illustrative example, each L1 cache 230 comprises separate instruction-specific and data-specific caches as respectively indicated by reference numerals 240 and 245.

Figure 3:
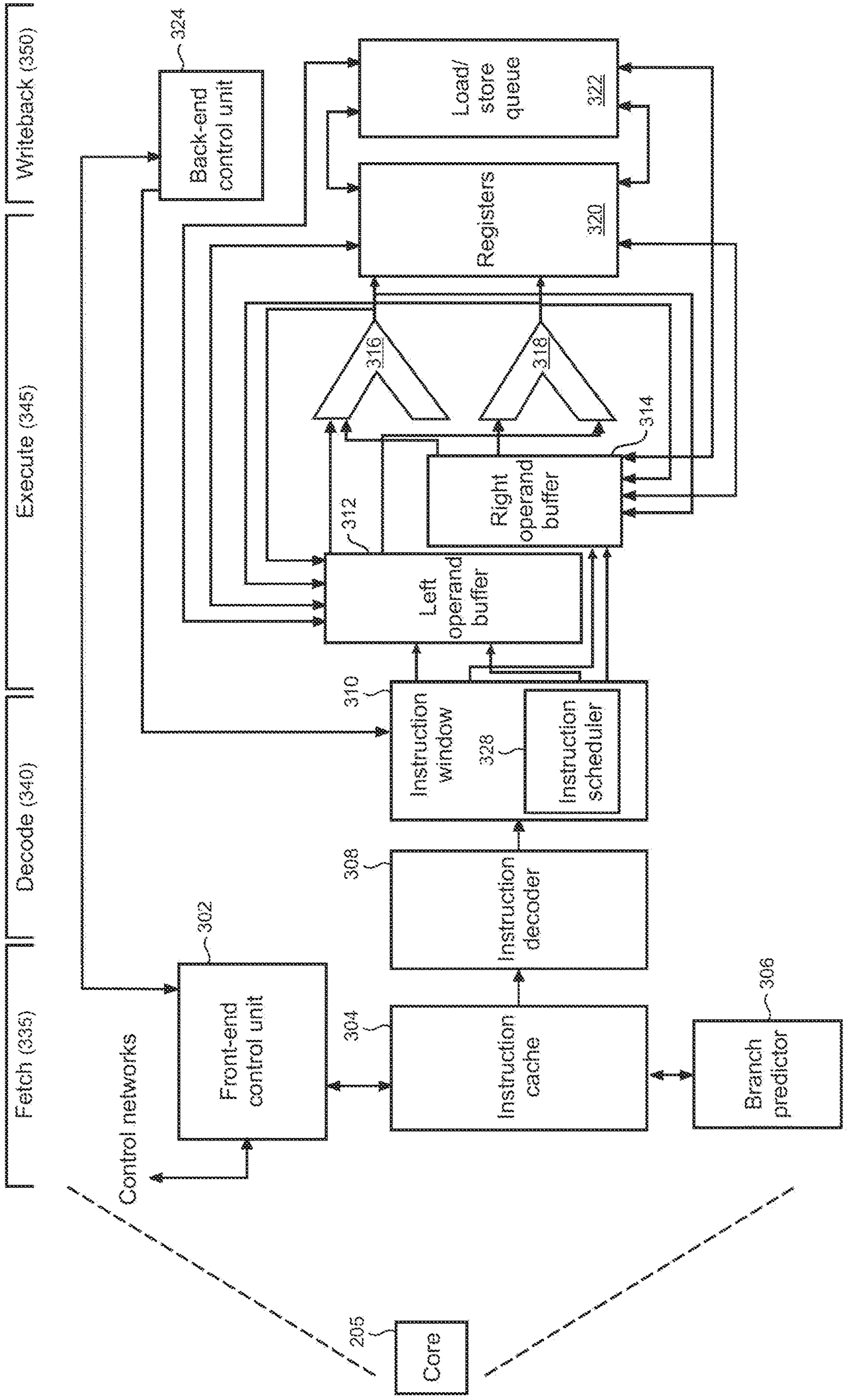
FIG. 3 shows an illustrative processor pipeline.

FIG. 3 is a simplified block diagram of a portion of an illustrative processor core 205. As shown, the processor core may include a front-end control unit 302, an instruction cache 304, a branch predictor 306, an instruction decoder 308, an instruction window 310, a left operand buffer 312, a right operand buffer 314, a first ALU 316, a second ALU 318, registers 320, and a load/store queue 322.

In some cases, the buses (indicated by the arrows) may carry data and instructions while in other cases, the buses may carry data (e.g., operands) or control signals. For example, the front-end control unit 302 may communicate, via a bus that carries only control signals, with other control networks. Although FIG. 3 shows a certain number of illustrative components for the processor core 205 that are configured in a particular arrangement, more or fewer components that are configured or arranged differently may be utilized depending on the needs of a particular implementation.

The front-end control unit 302 may include circuitry configured to control the flow of information through the processor core and circuitry to coordinate activities within it. The front-end control unit 302 also may include circuitry to implement a finite state machine (FSM) in which states enumerate each of the operating configurations that the processor core may take. Using opcodes and/or other inputs (e.g., hardware-level signals), the FSM circuits in the front-end control unit 302 can determine the next state and control outputs.

Accordingly, the front-end control unit 302 can fetch instructions from the instruction cache 304 for processing by the instruction decoder 308. The front-end control unit 302 may exchange control information with other portions of the processor core 205 over control networks or buses. For example, the front-end control unit may exchange control information with a back-end control unit 324. The front-end and back-end control units may be integrated into a single control unit in some implementations.

The front-end control unit 302 may also coordinate and manage control of various cores and other parts of a processor 200 (FIG. 2). Accordingly, for example, blocks of instructions may be simultaneously executing on multiple cores and the front-end control unit 302 may exchange control information via control networks with other cores to ensure synchronization, as needed, for execution of the various blocks of instructions.

The front-end control unit 302 may further process control information and meta-information regarding blocks of instructions that are executed atomically. For example, the front-end control unit 302 can process block headers that are associated with blocks of instructions. The block header may include control information and/or meta-information regarding the block of instructions. Accordingly, the front-end control unit 302 can include combinational logic, state machines, and temporary storage units, such as flip-flops, to process the various fields in the block header.

The front-end control unit 302 may fetch and decode a single instruction or multiple instructions per clock cycle. The decoded instructions may be stored in an instruction window 310 that is implemented in processor core hardware as a buffer. The instruction window 310 can support an instruction scheduler 328, in some implementations, which may keep a ready state of each decoded instruction's inputs such as predications and operands. For example, when all of its inputs (if any) are ready, a given instruction may be woken up by instruction scheduler 328 and be ready to issue.

Before an instruction is issued, any operands required by the instruction may be stored in the left operand buffer 312 and/or the right operand buffer 314, as needed. Depending on the opcode of the instruction, operations may be performed on the operands using ALU 316 and/or ALU 318 or other functional units. The outputs of an ALU may be stored in an operand buffer or stored in one or more registers 320. Store operations that issue in a data flow order may be queued in load/store queue 322 until a block of instruction commits. When the block of instruction commits, the load/store queue 322 may write the committed block's stores to a memory. The branch predictor 306 may process block header information relating to branch exit types and factor that information in making branch predictions.

The elements making up the processor core 205 as shown in FIG. 3 and described above can be logically viewed as a processor pipeline 330. The processor pipeline comprises various processing stages including fetch 335, decode 340, execute 345, and writeback 350. Memory access (not shown) may also be considered as a stage of the processor pipeline in some cases.

Figure 4:
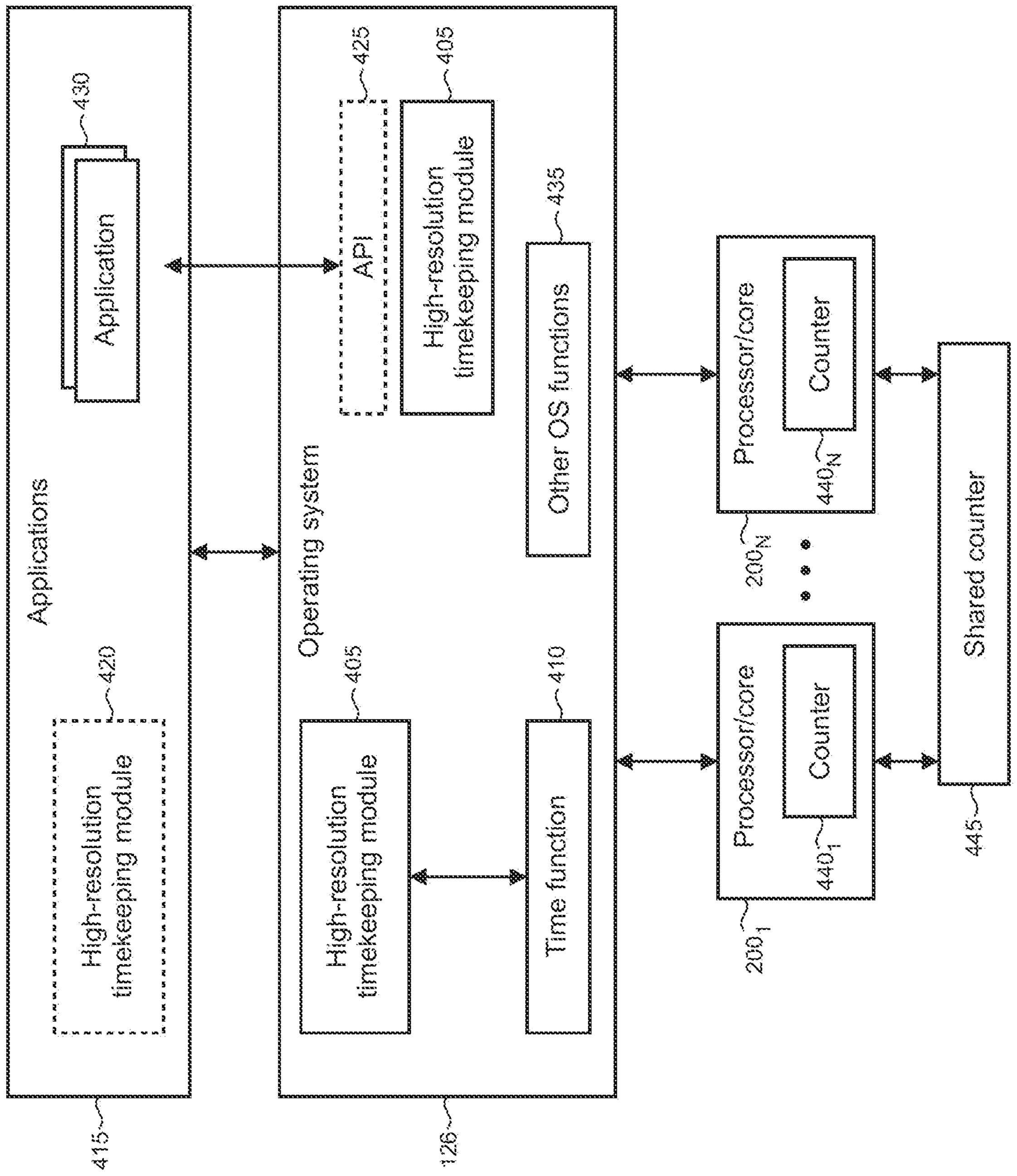
FIG. 4 shows an illustrative high-resolution timekeeping module that interacts with a time function that is instantiated in an operating system of a computing device.

FIG. 4 shows an illustrative high-resolution timekeeping module 405 that interacts with a time function 410 that is instantiated in an operating system 126 of a computing device 110 (FIG. 1). The high-resolution timekeeping module is shown as being implemented as a functional element that is instantiated in the operating system. However, in alterative scenarios, the high-resolution timekeeping module can be implemented in an application layer 415 as a stand-alone application 420 or be incorporated as a feature of another application (not shown).

In another alternative scenario, the high-resolution timekeeping module 405 can be configured with an application programming interface (API) 425 that exposes its functions and features to applications 430 in the application layer 415. For example, the applications can be configured to make calls to the high-resolution timekeeping module which, in turn, makes calls with the time function 410. In this way, the benefits of the present deterministic generation of timestamps and derived values can be accessed by the applications as an operating system function or API in a similar manner, for example, as with other operating system functions 435.

The time function 410 is configured to retrieve a current value of a counter 440 that is maintained by each processor 200 or core. In some implementations, a commonly-shared counter 445 can be shared among multiple processor cores. The counter is typically implemented as a hardware register that runs continuously at a fixed frequency (i.e., the counter rate is invariant) and does not stop until the processor is reset. The counter operates independently of an external time reference.

The high-resolution timekeeping module 405 is configured to mitigate against the unpredictable execution of the time function 410 that can result in computed time values that are not accurate within a precision that may be needed in some scenarios. For example, time stamps and time-interval measurements are an integral part of computer and network performance measurements. These performance measurement operations include the computation of response time, throughput, and latency as well as profiling code execution. Each of these operations involves a measurement of activities that occur during a time interval that is defined by a start and an end event that can be independent of any external time-of-day reference.

Program code running on a processor of a computing device commonly utilize execution paths involving branching logic that does not always execute in a completely predictable manner. Such unpredictability, when combined with typical processor power saving techniques such as the use of sleep states, can negatively impact the accuracy of timestamps or values that are derived from a counter that continuously runs in one or more cores of the processor.

The issues with accuracy may be compounded in scenarios in which complex CPUs are utilized. Complex CPUs may have multiple logical and/or physical processor cores that may utilize multi-level instruction and data caching. While providing excellent performance, complex CPUs commonly utilize sleep states to lower their internal operating frequency (i.e., clock rate) to manage power consumption and heat generation. Sleep state settings are present in the BIOS (basic input/output system) settings in typical cases, and changing the setting may require a reboot of the computing device.

Figure 5:
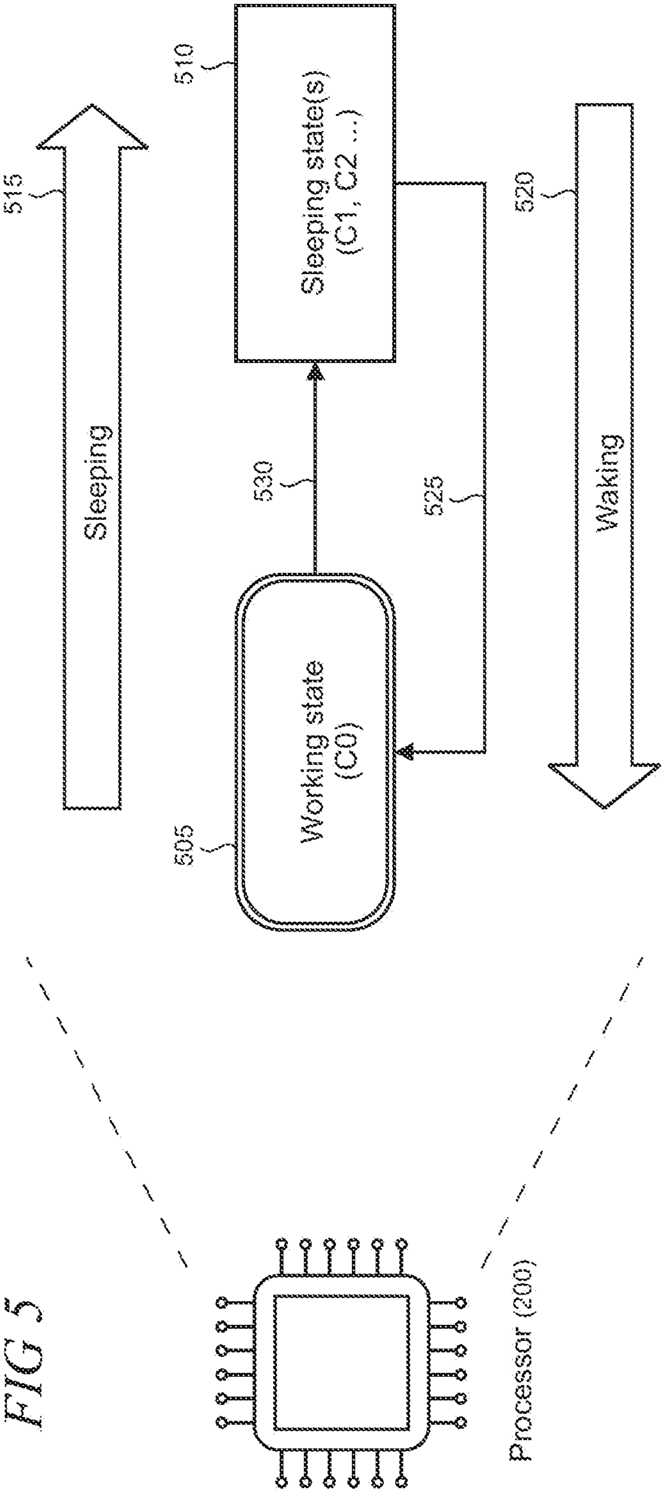
FIG. 5 illustratively shows how a processor can switch between a working state and sleep states.

FIG. 5 illustratively shows how a processor 200 or core can switch between a working state C0 (indicated by reference numeral 505) and sleep states C1, C2, etc. (indicated by reference numeral 510). Different processor types can use a different number of sleep states. In general, the higher the C number, the deeper into sleep mode the processor goes. The sleep modes typically work by progressively cutting the clock signal and power from idle units inside the processor. When a system transitions to a sleep state (as indicated by arrow 515), as more units are stopped by cutting the clock, reducing voltage, or by being shut down completely, the more energy is saved. However, deeper sleep requires more time to fully wake up into the working state.

A system is waking (indicated by arrow 520) when it is transitioning from a sleep state 510 to the working state 505. As indicated by the flow control lines 525 and 530, a system typically needs to return to a working state before transitioning to another sleep state. Because a system in an intermediate sleep state has already lost some operating context, it must return to the working state to restore that context before it can make an additional state transition.

Figure 6:
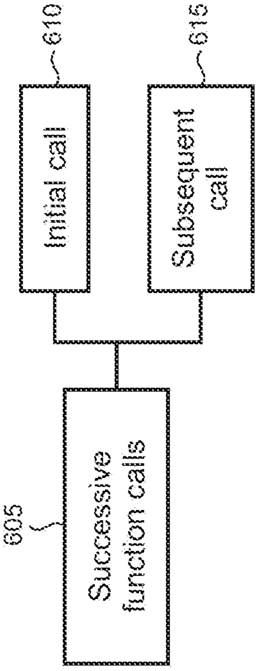
FIG. 6 shows an illustrative succession of function calls that is performed by a timekeeping module.

The high-resolution timekeeping module 405 (FIG. 4) is configured to execute successive calls to the time function 410 to implement the sleep state mitigation. As shown in FIG. 6, the successive function calls 605 comprise an initial call 610 and a subsequent call 615. The successive calls are designed to make use of the inherent processor behaviors when executing instructions.

Figure 7:
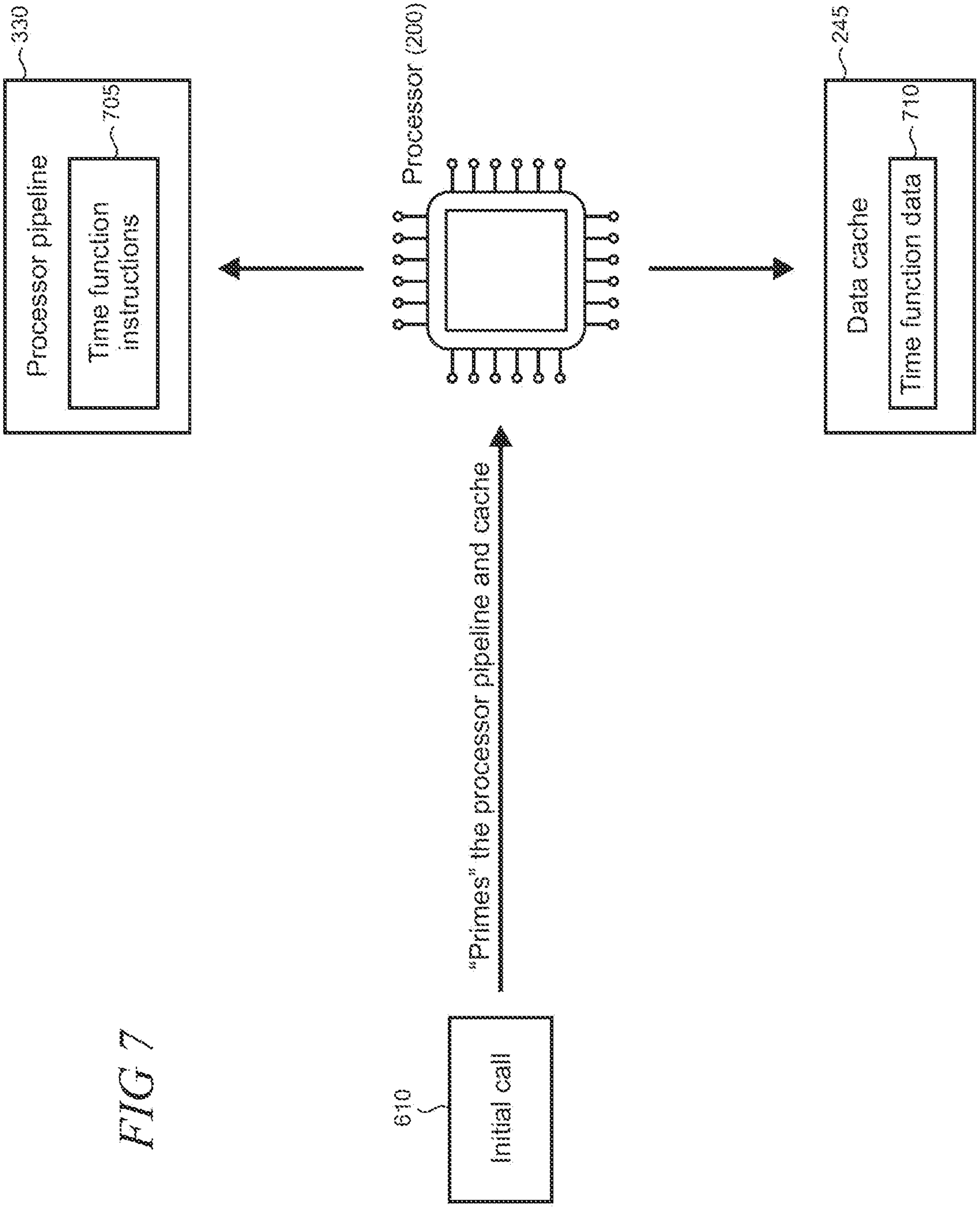
FIG. 7 illustratively provides a high-level overview showing how an initial call to a time function "primes" the processor pipeline and data cache.

As shown in FIG. 7, the initial call 610 is intended to "prime" the processor so that it loads the time function instructions 705 into the processor pipeline 330 and caches associated time function data 710 into the data cache 245. That is, the initial call to the time function operates to stage the appropriate instructions and data in place. As the time function instructions are executed, programmatic branching may occur, and the processor may transition from the working state to one or more sleep states and back again which can inject random variability into the accuracy of the counter value. However, as the initial call is intended to stage the instructions and data by design, the precision of the counter value that is returned in response is inconsequential.

Figure 8:
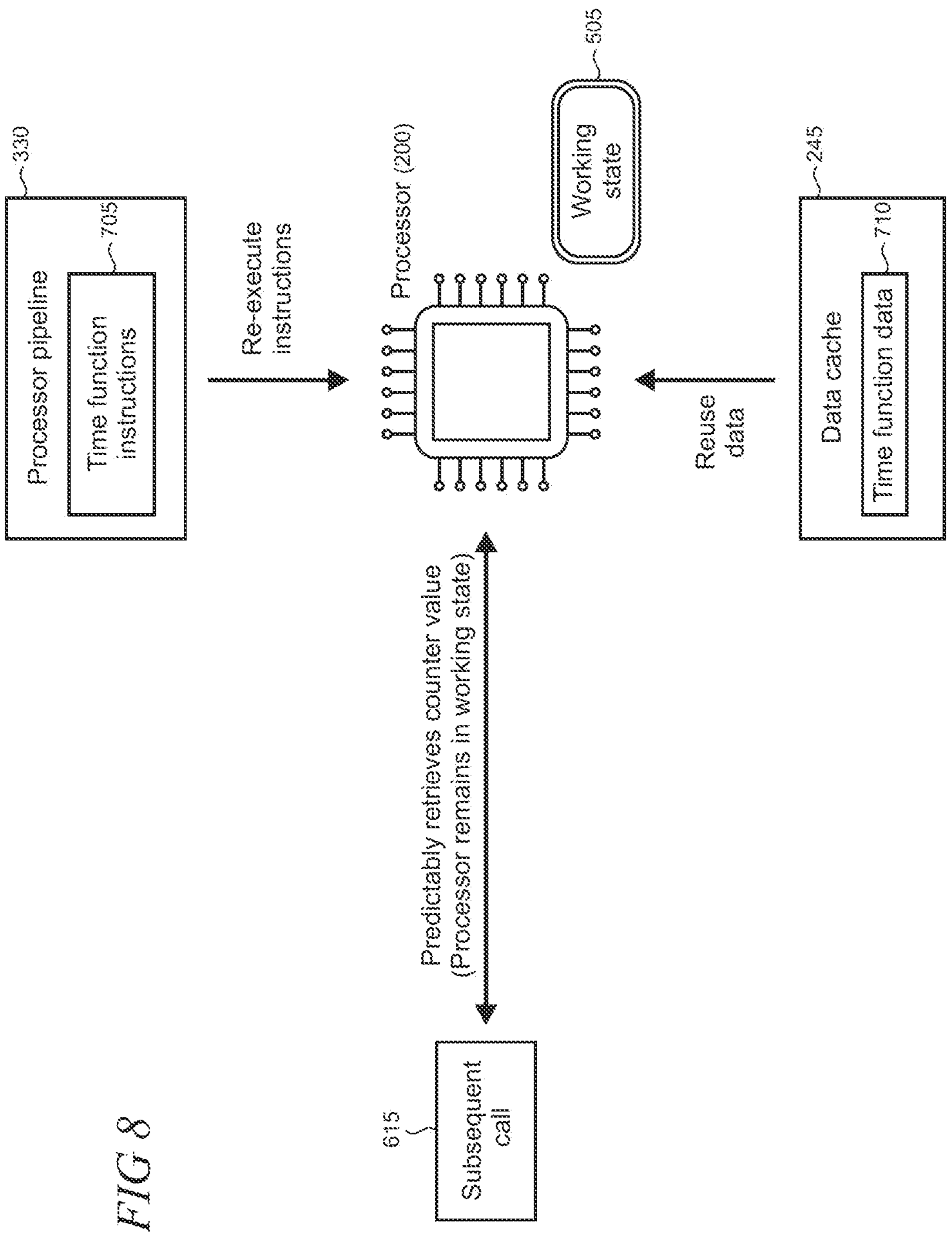
FIG. 8 illustratively provides a high-level overview showing how a subsequent call to a time function predictably retrieves a counter value from the processor.

As shown in FIG. 8, the subsequent call 615 to the time function works to retrieve the counter value in a predictable manner. As the processor 200 was already primed with the instructions 705 and data 710 from the initial function call, it will remain in the working state 505, without transitioning to a sleep state, when executing the time function the second time. Observation of the successive function calls demonstrates that the processor, when so primed to remain in the working state, will execute the time function predictably and consistently in a substantially fixed time interval. Thus, a timestamp generated with the counter value retrieved from the processor in a constant working state is more accurate as it does not include the unpredictable delay resulting from transition to and from sleep states.

Figure 9:
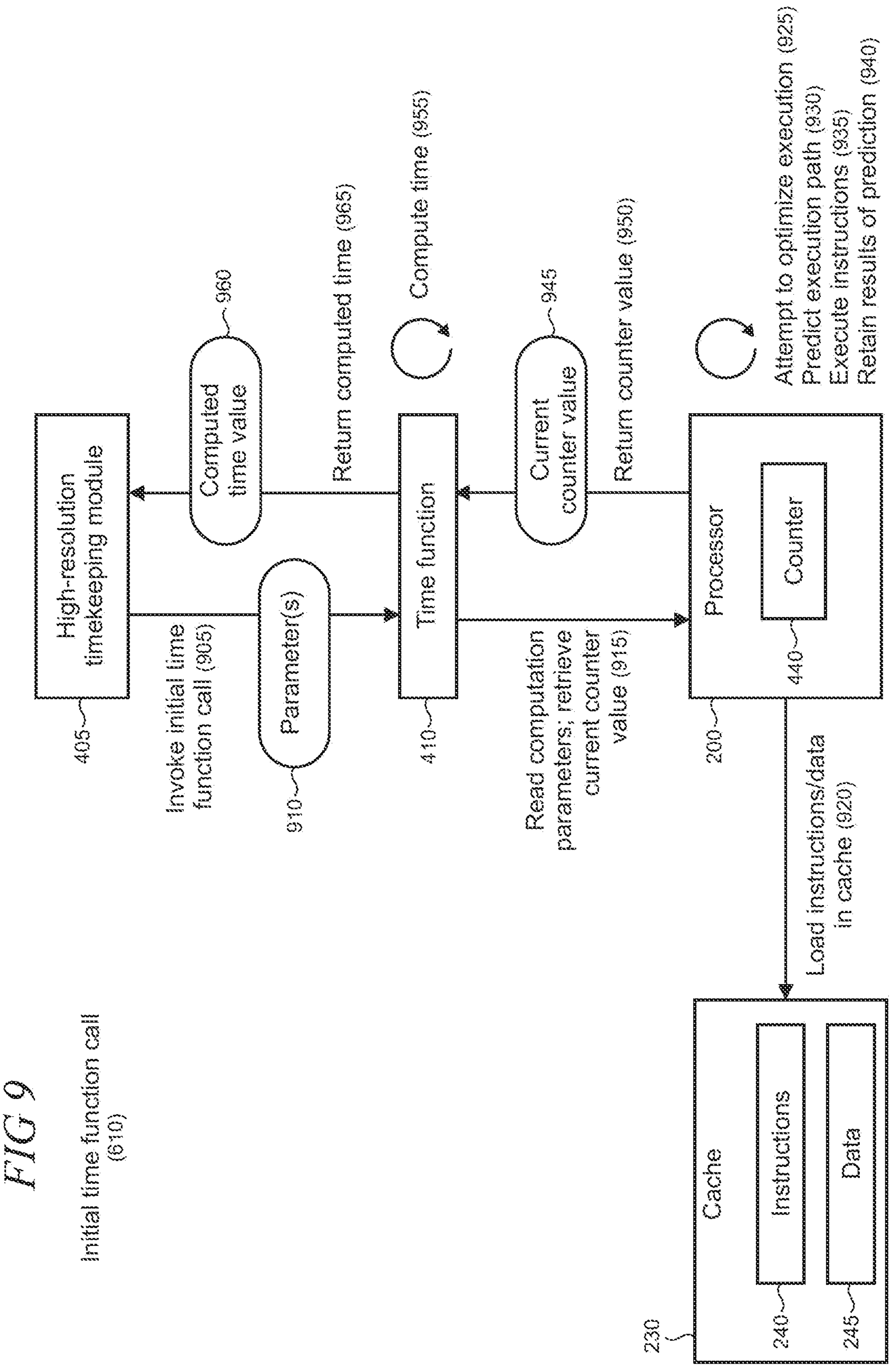
FIG. 9 shows a workflow for an illustrative high-resolution timekeeping module during an initial call to a time function.
Figure 10:
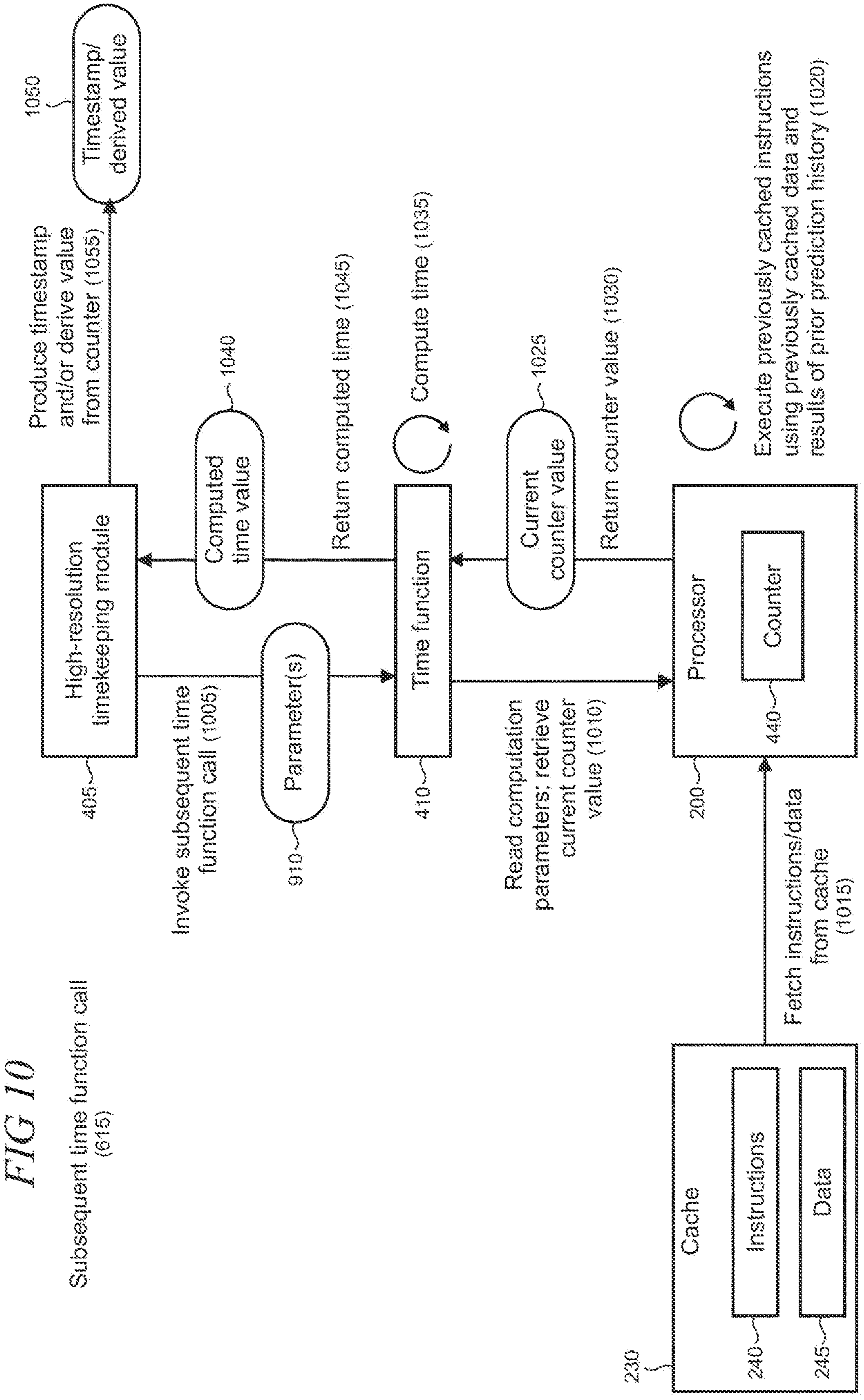
FIG. 10 shows a workflow for an illustrative high-resolution timekeeping module during a subsequent call to a time function.

FIGS. 9 and 10 respectively show details of the workflow for the high-resolution timekeeping module 405 during the initial and subsequent calls to the time function 410. In FIG. 9, the workflow is initiated by the high-resolution timekeeping module invoking the time function (indicated by reference numeral 905) and passing function parameters 910. The function parameters may include, for example, a pointer to a variable to receive the current counter value. The initially called time function can read computation parameters from the processor pipeline 330 (FIG. 3) that are needed to perform a time computation including a start time value, counter to time conversion parameters, etc., and retrieve a current counter value (915) from the processor 200 that maintains the counter 440.

The processor 200 retrieves time function instructions and associated function data from the main memory and loads them into respective caches 240 and 245 (920). As with all instructions, the processor will attempt to optimize instruction execution to reduce total execution time and improve overall processor performance (925). Such optimization may include execution path prediction (930) performed by the branch predictor 306 (FIG. 3) that works to anticipate and then fetch and queue instructions and data that it predicts may be used at a later point. Execution path prediction is intended to reduce or eliminate idle time while the processor waits for appropriate instructions or data to arrive for a next step in the instruction execution.

While execution path prediction is accurate on the whole, programs and functions are inherently complex, and it may be difficult to predict with complete accuracy which instructions will be needed next due to programmatic branching in the instructions. The processor loads instructions into the pipeline 330 (FIG. 3) from the instruction cache for execution (935). When a prediction is incorrect, the pipeline may be flushed of the wrongly fetched data and instructions and the processor loads appropriate new instructions. The results of the execution path prediction are typically retained or stored as a history by the processor (940), for example using a register, to enable multi-level, dynamic, or adaptive prediction. The processor 200 may transition to a sleep state one or more times during a pipeline flush and refill, and the time to fully execute the function's instructions may therefore be unpredictable.

The processor 200 returns a current counter value 945 to the time function 410 (950). The time function computes the time (955) using the computation parameters and returns a computed time value 960 to the high-resolution timekeeping module 405 in response to the initial call (965).

In FIG. 10, the subsequent call workflow begins with the high-resolution timekeeping module 405 invoking the time function (1005) and passing function parameters 910. The function parameters (e.g., a pointer to a variable to receive the current counter value) passed from the subsequent call are the same as with the initial call. As before, the subsequently called time function can read computation parameters from the processor pipeline 330 (FIG. 3) that are needed to perform a time computation and retrieve a current counter value (1010) from the processor 200 that maintains the counter 440.

As the instructions 240 and data 245 were previously cached during the initial call, the processor can fetch them from the cache 230 (1015). The processor will execute the previously cached instructions and data in view of the prior prediction history (1020). The processor returns a current counter value 1025 to the time function 410 (1030). The time function computes the time (1035). The same fixed time computation parameters are used in each call with the single variable being a value that is read from the counter.

The time function 410 returns a computed time value 1040 to the high-resolution timekeeping module 405 in response to the initial call (1045). The high-resolution timekeeping module can produce a timestamp or derived value 1050 using the counter value (1055).

Figure 11:
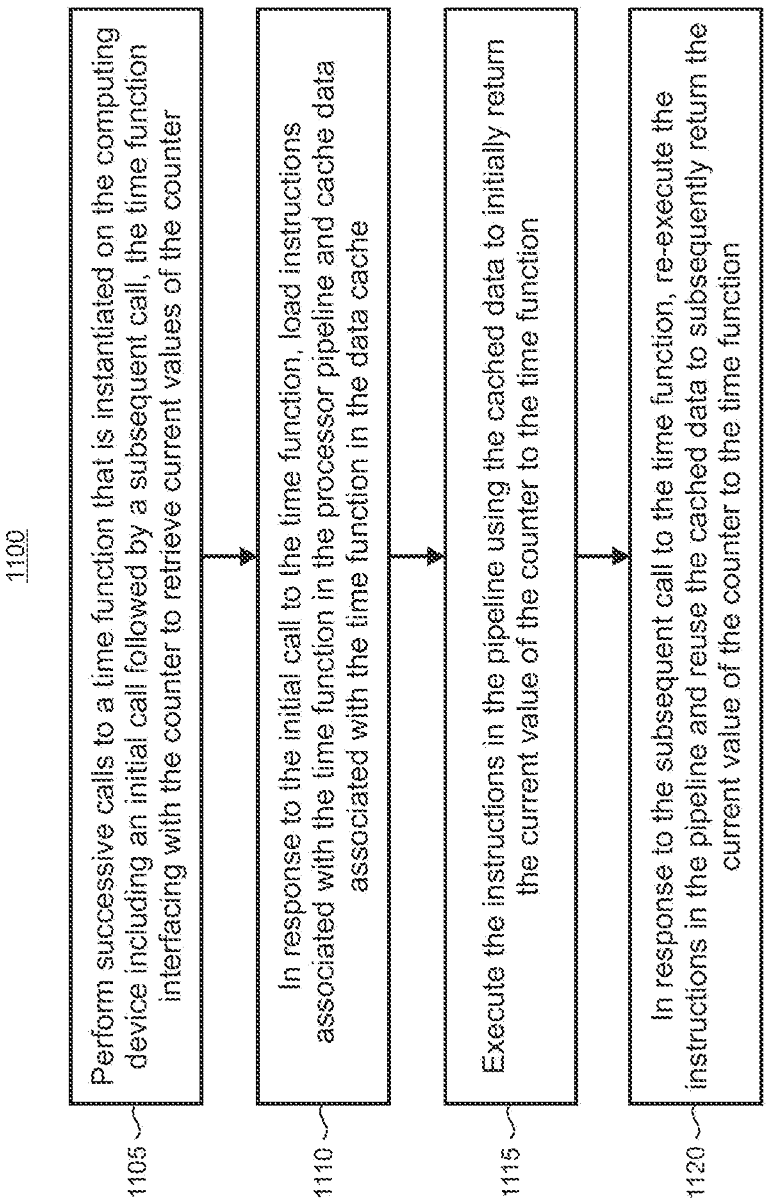
FIGS. 11, 12, and 13 are flowcharts of illustrative methods of the present accurate timestamp or derived counter value generation on a complex CPU.

FIG. 11 is a flowchart 1100 of an illustrative computer-implemented method for deterministically generating a timestamp or a value derived from a continuously running counter associated with at least one processor on a computing device, the processor including a processor pipeline and data cache. Unless specifically stated, methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

At step 1105, successive calls to a time function that is instantiated on the computing device are performed including an initial call followed by a subsequent call, the time function interfacing with the counter to retrieve current values of the counter. At step 1110, in response to the initial call to the time function, instructions associated with the time function are loaded in the processor pipeline and data associated with the time function is cached in the data cache.

At step 1115, the instructions in the pipeline are executed using the cached data to initially return the current value of the counter to the time function. At step 1120, in response to the subsequent call to the time function, the instructions in the pipeline are re-executed and the cached data is reused to subsequently return the current value of the counter to the time function.

Figure 12:
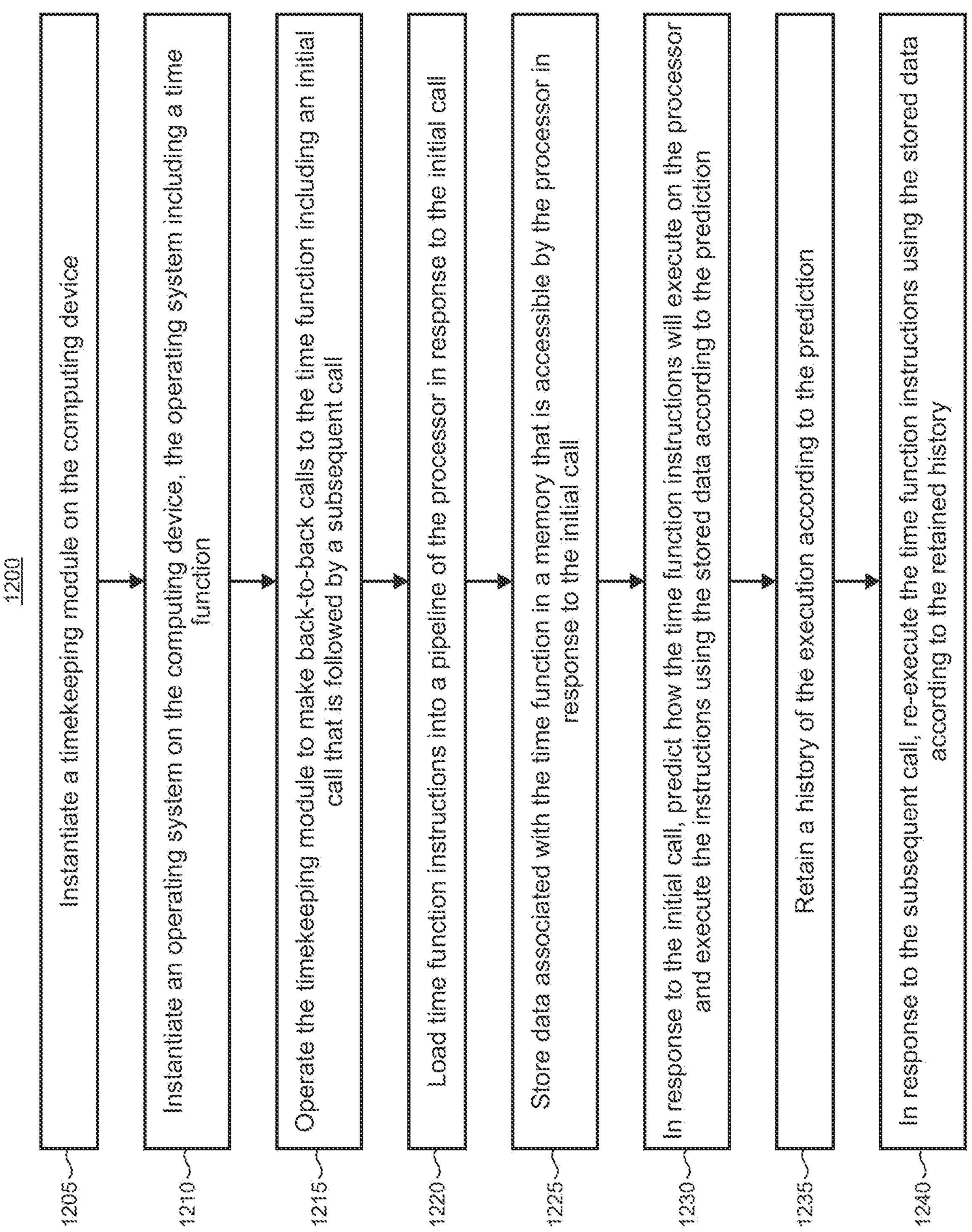

FIG. 12 is a flowchart 1200 of an illustrative method that may be performed by at least one processor in a computing device that executes instructions stored on one or more hardware-based non-transitory computer-readable storage media. At step 1205. a timekeeping module is instantiated on the computing device. At step 1210, an operating system is instantiated on the computing device where the operating system includes a time function.

At step 1215, the timekeeping module is operated to make back-to-back calls (i.e., successive calls) to the time function where the back-to-back calls include an initial call that is followed by a subsequent call. At step 1220, time function instructions are loaded into a pipeline of the processor in response to the initial call. At step 1225, data associated with the time function is stored in a memory that is accessible by the processor in response to the initial call.

At step 1230, in response to the initial call, a prediction is made as to how the time function instructions will execute on the processor and the instructions are executed on the processor using the stored data according to the prediction. At step 1235, a history of the execution according to the prediction is retained (e.g., using a register). At step 1240, in response to the subsequent call, the time function instructions are re-executed using the stored data according to the retained results.

Figure 13:
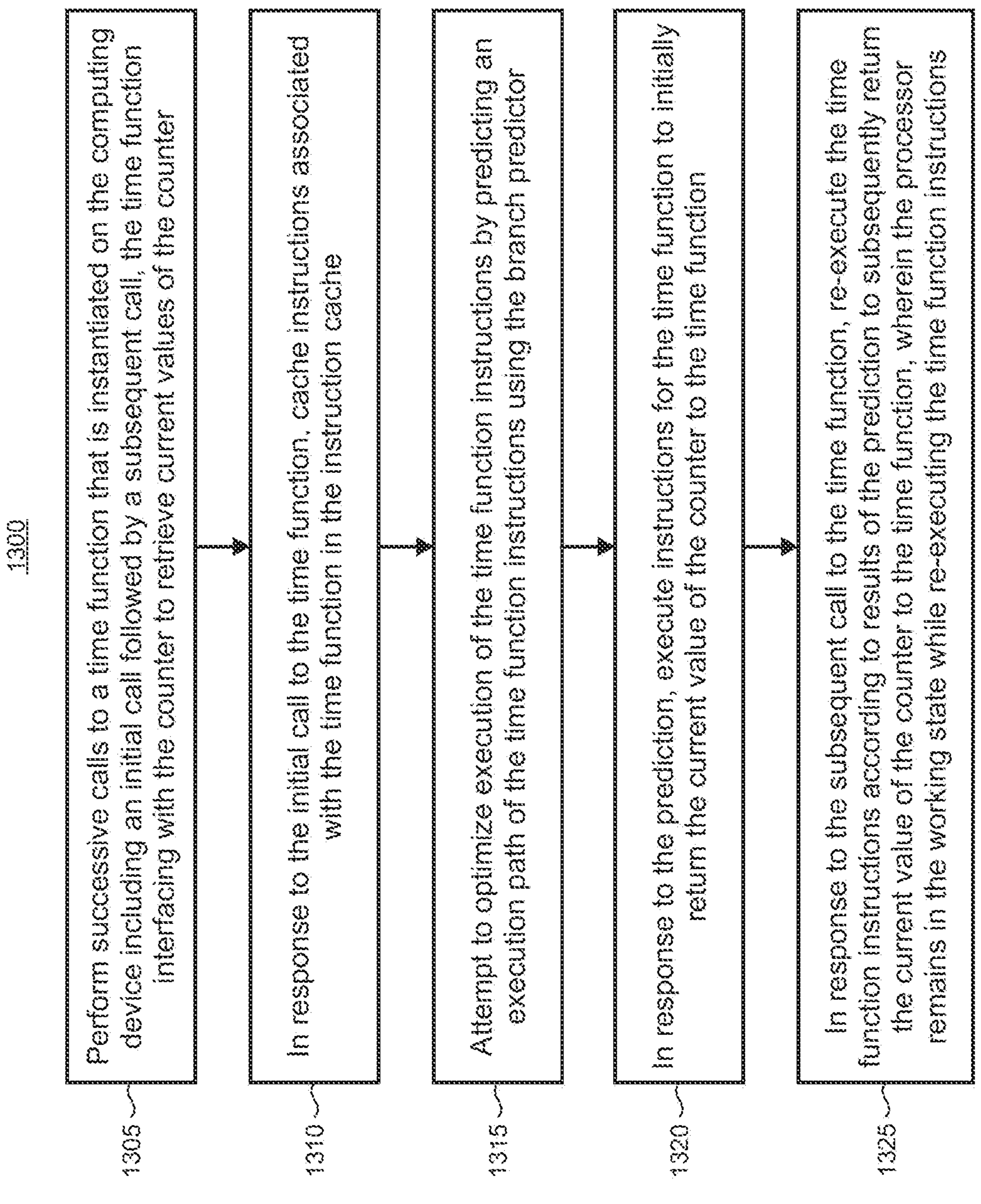

FIG. 13 is a flowchart 1300 of an illustrative method that may be performed by a computing device configured with a timer that may be implemented using the high-resolution timekeeping module described above. The computing device includes a processor having a continuously running counter, an instruction cache, and a branch predictor. The computing device has a working state and one or more sleep states At step 1305, successive calls to a time function that is instantiated on the computing device are performed including an initial call followed by a subsequent call in which the time function interfaces with the counter to retrieve current values of the counter.

At step 1310, in response to the initial call to the time function, instructions associated with the time function are cached in the instruction cache. At step 1315, optimization of execution of the time function instructions is attempted by predicting an execution path of the time function instructions using the branch predictor. At step 1320, in response to the prediction, instructions for the time function are executed to initially return the current value of the counter to the time function.

At step 1325, in response to the subsequent call to the time function, the time function instructions are re-executed according to results of the prediction to subsequently return the current value of the counter to the time function, wherein the processor remains in the working state while re-executing the time function instructions.

Figure 14:
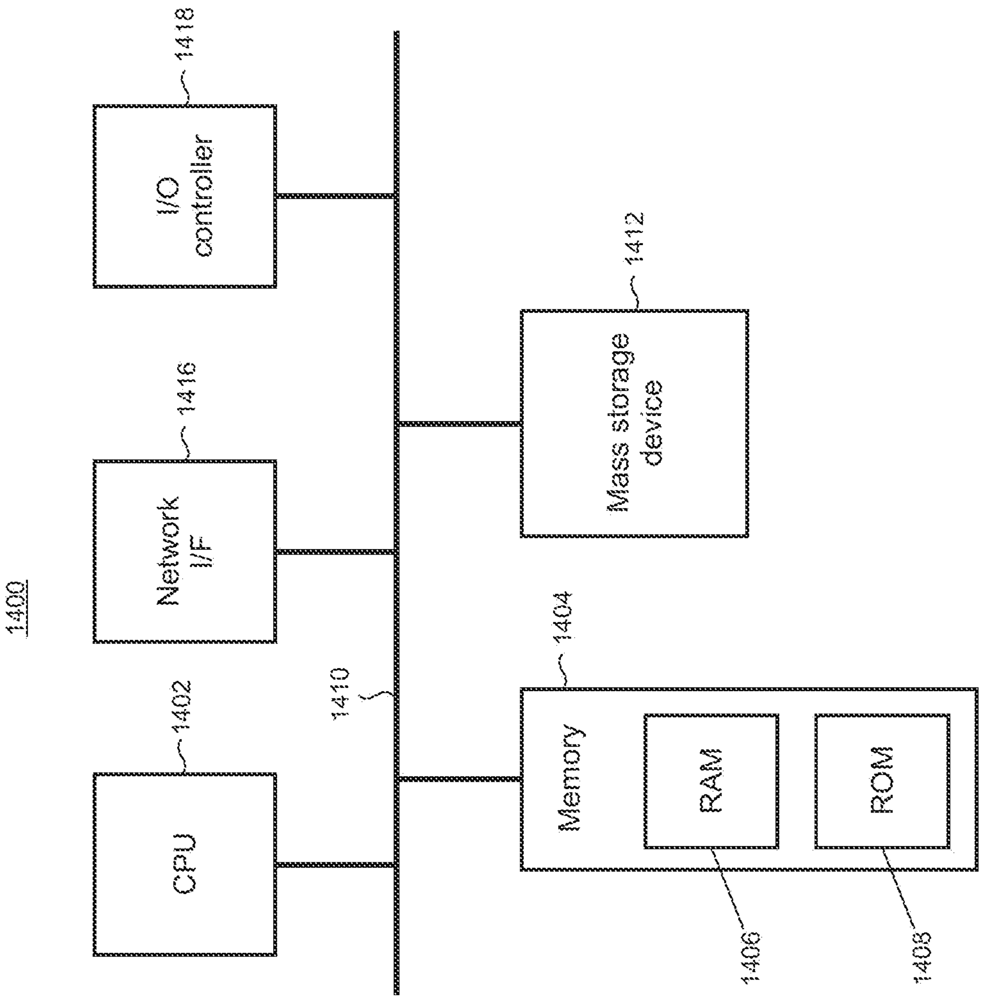
FIG. 14 is a block diagram of an illustrative computing device architecture that may be used at least in part to implement the present accurate timestamp or derived counter value generation on a complex CPU.

FIG. 14 shows an illustrative architecture 1400 for a device, such as a server, capable of executing the various components described herein for the present accurate timestamp or derived counter value generation on a complex CPU. The architecture 1400 illustrated in FIG. 14 includes one or more processors 1402 (e.g., central processing unit, dedicated AI chip, graphics processing unit, etc.), a system memory 1404, including RAM (random-access memory) 1406 and ROM (read only memory) 1408, and a system bus 1410 that operatively and functionally couples the components in the architecture 1400. A basic input/output system containing the basic routines that help to transfer information between elements within the architecture 1400, such as during startup, is typically stored in the ROM 1408. The architecture 1400 further includes a mass storage device 1412 for storing software code or other computer-executed code that is utilized to implement applications, the file system, and the operating system. The mass storage device 1412 is connected to the processor 1402 through a mass storage controller (not shown) connected to the bus 1410. The mass storage device 1412 and its associated computer-readable storage media provide non-volatile storage for the architecture 1400. Although the description of computer-readable storage media contained herein refers to a mass storage device, such as a hard disk or CD-ROM drive, it may be appreciated by those skilled in the art that computer-readable storage media can be any available storage media that can be accessed by the architecture 1400.

By way of example, and not limitation, computer-readable storage media may include volatile and non-volatile, removable, and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 1400.

According to various embodiments, the architecture 1400 may operate in a networked environment using logical connections to remote computers through a network. The architecture 1400 may connect to the network through a network interface unit 1416 connected to the bus 1410. It may be appreciated that the network interface unit 1416 also may be utilized to connect to other types of networks and remote computer systems. The architecture 1400 also may include an input/output controller 1418 for receiving and processing input from a number of other devices, including a keyboard, mouse, touchpad, touchscreen, control devices such as buttons and switches or electronic stylus (not shown in FIG. 14). Similarly, the input/output controller 1418 may provide output to a display screen, user interface, a printer, or other type of output device (also not shown in FIG. 14).

It may be appreciated that the software components described herein may, when loaded into the processor 1402 and executed, transform the processor 1402 and the overall architecture 1400 from a general-purpose computing system into a special-purpose computing system customized to facilitate the functionality presented herein. The processor 1402 may be constructed from any number of transistors or other discrete circuit elements, which may individually or collectively assume any number of states. More specifically, the processor 1402 may operate as a finite-state machine, in response to executable instructions contained within the software modules disclosed herein. These computer-executable instructions may transform the processor 1402 by specifying how the processor 1402 transitions between states, thereby transforming the transistors or other discrete hardware elements constituting the processor 1402.

Encoding the software modules presented herein also may transform the physical structure of the computer-readable storage media presented herein. The specific transformation of physical structure may depend on various factors in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 1400 in order to store and execute the software components presented herein. It also may be appreciated that the architecture 1400 may include other types of computing devices, including wearable devices, handheld computers, embedded computer systems, smartphones, PDAs, and other types of computing devices known to those skilled in the art. It is also contemplated that the architecture 1400 may not include all of the components shown in FIG. 14, may include other components that are not explicitly shown in FIG. 14, or may utilize an architecture completely different from that shown in FIG. 14.

Figure 15:
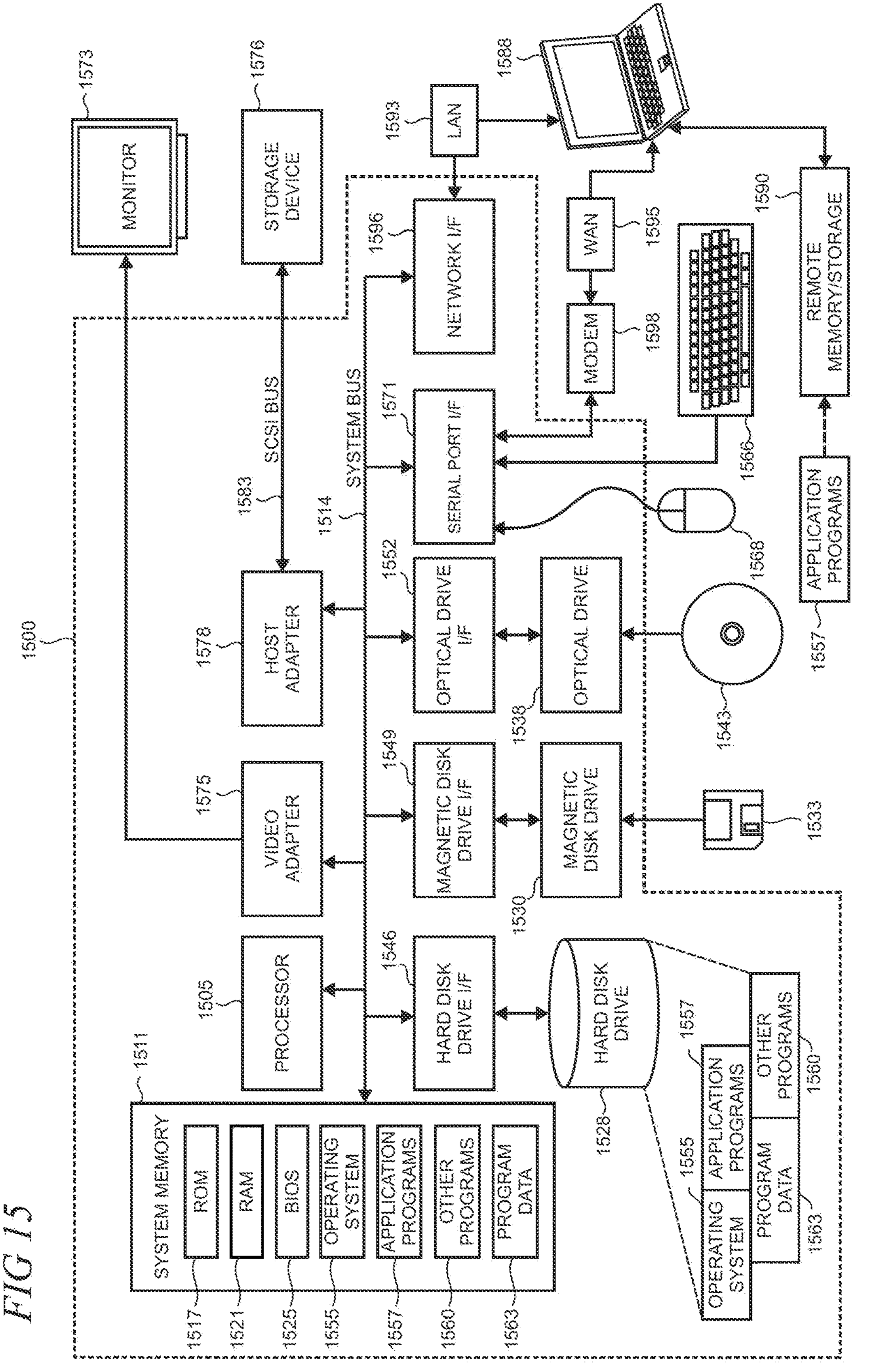
FIG. 15 is a simplified block diagram of an illustrative computing device that may be used at least in part to implement the present accurate timestamp or derived counter value generation on a complex CPU.

FIG. 15 is a simplified block diagram of an illustrative computing device 1500 such as a PC, client machine, or server with which the present accurate timestamp or derived counter value generation on a complex CPU may be implemented. Computing device 1500 includes a processor 1505, a system memory 1511, and a system bus 1514 that couples various system components including the system memory 1511 to the processor 1505. The system bus 1514 may be any of several types of bus structures including a memory bus or memory controller, a peripheral bus, or a local bus using any of a variety of bus architectures. The system memory 1511 includes read only memory (ROM) 1517 and random-access memory (RAM) 1521. A basic input/output system (BIOS) 1525, containing the basic routines that help to transfer information between elements within the computing device 1500, such as during startup, is stored in ROM 1517. The computing device 1500 may further include a hard disk drive 1528 for reading from and writing to an internally disposed hard disk (not shown), a magnetic disk drive 1530 for reading from or writing to a removable magnetic disk 1533 (e.g., a floppy disk), and an optical disk drive 1538 for reading from or writing to a removable optical disk 1543 such as a CD (compact disc), DVD (digital versatile disc), or other optical media. The hard disk drive 1528, magnetic disk drive 1530, and optical disk drive 1538 are connected to the system bus 1514 by a hard disk drive interface 1546, a magnetic disk drive interface 1549, and an optical drive interface 1552, respectively. The drives and their associated computer-readable storage media provide non-volatile storage of computer-readable instructions, data structures, program modules, and other data for the computing device 1500. Although this illustrative example includes a hard disk, a removable magnetic disk 1533, and a removable optical disk 1543, other types of computer-readable storage media which can store data that is accessible by a computer such as magnetic cassettes, Flash memory cards, digital video disks, data cartridges, random-access memories (RAMs), read only memories (ROMs), and the like may also be used in some applications of the present accurate timestamp or derived counter value generation on a complex CPU. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are intended to cover non-transitory embodiments, and does not include waves, signals, and/or other transitory and/or intangible communication media.

A number of program modules may be stored on the hard disk, magnetic disk 1533, optical disk 1543, ROM 1517, or RAM 1521, including an operating system 1555, one or more application programs 1557, other program modules 1560, and program data 1563. A user may enter commands and information into the computing device 1500 through input devices such as a keyboard 1566 and pointing device 1568 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 1505 through a serial port interface 1571 that is coupled to the system bus 1514, but may be connected by other interfaces, such as a parallel port, game port, or universal serial bus (USB). A monitor 1573 or other type of display device is also connected to the system bus 1514 via an interface, such as a video adapter 1575. In addition to the monitor 1573, personal computers typically include other peripheral output devices (not shown), such as speakers and printers. The illustrative example shown in FIG. 15 also includes a host adapter 1578, a Small Computer System Interface (SCSI) bus 1583, and an external storage device 1576 connected to the SCSI bus 1583.

The computing device 1500 is operable in a networked environment using logical connections to one or more remote computers, such as a remote computer 1588. The remote computer 1588 may be selected as another personal computer, a server, a router, a network PC, a peer device, or other common network node, and typically includes many or all of the elements described above relative to the computing device 1500, although only a single representative remote memory/storage device 1590 is shown in FIG. 15. The logical connections depicted in FIG. 15 include a local area network (LAN) 1593 and a wide area network (WAN) 1595. Such networking environments are often deployed, for example, in offices, enterprise-wide computer networks, intranets, and the Internet.

When used in a LAN networking environment, the computing device 1500 is connected to the local area network 1593 through a network interface or adapter 1596. When used in a WAN networking environment, the computing device 1500 typically includes a broadband modem 1598, network gateway, or other means for establishing communications over the wide area network 1595, such as the Internet. The broadband modem 1598, which may be internal or external, is connected to the system bus 1514 via a serial port interface 1571. In a networked environment, program modules related to the computing device 1500, or portions thereof, may be stored in the remote memory storage device 1590. It is noted that the network connections shown in FIG. 15 are illustrative and other means of establishing a communications link between the computers may be used depending on the specific requirements of an application of the present accurate timestamp or derived counter value generation on a complex CPU.

Various exemplary embodiments of the present accurate timestamp or derived counter value generation on a complex CPU are now presented by way of illustration and not as an exhaustive list of all embodiments. An example includes a computer-implemented method for deterministically generating a timestamp or a value derived from a continuously running counter associated with at least one processor on a computing device, the processor including a processor pipeline and data cache, the computer-implemented method comprising: performing successive calls to a time function that is instantiated on the computing device including an initial call followed by a subsequent call, the time function interfacing with the counter to retrieve current values of the counter; in response to the initial call to the time function, loading instructions associated with the time function in the processor pipeline and caching data associated with the time function in the data cache; executing the instructions in the pipeline using the cached data to initially return the current value of the counter to the time function; and in response to the subsequent call to the time function, re-executing the instructions in the pipeline and reusing the cached data to subsequently return the current value of the counter to the time function.

In another example, the computer-implemented method further includes using the subsequently returned counter value to generate a timestamp. In another example, the computer-implemented method further includes using the subsequently returned counter value to generate a derived value. In another example, the processor has a working state and one or more sleep states, and the successive calls to the time function cause the processor to remain in a working state while re-executing the instructions and reusing the cached data to subsequently return the current value of the counter to the time function. In another example, the processor applies predictive execution to optimize execution of the instructions in response to the initial call and uses results of the predictive execution for re-execution of the instructions in response to the subsequent call. In another example, the processor pipeline is configured with stages comprising fetching, decoding, execution, and writing-back. In another example, the processor pipeline is configured with predictive execution capabilities. In another example, the at least one processor comprises one or more of multi-level instruction caches or multiple cores, wherein each of the multiple cores includes an individual counter, or the multiple cores commonly share a counter.

A further example includes one or more hardware-based non-transitory computer-readable memory devices storing computer-executable instructions which, upon execution by at least one processor in a computing device, cause the computing device to: instantiate a timekeeping module on the computing device; instantiate an operating system on the computing device, the operating system including a time function; operate the timekeeping module to make back-to-back calls to the time function including an initial call that is followed by a subsequent call; load time function instructions into a pipeline of the processor in response to the initial call; store data associated with the time function in a memory that is accessible by the processor in response to the initial call; in response to the initial call, predict how the time function instructions will execute on the processor and execute the instructions using the stored data according to the prediction; retain a history of the execution according to the prediction; and in response to the subsequent call, re-execute the time function instructions using the stored data according to the retained history.

In another example, the timekeeping module is operable as one of application feature or operating system feature. In another example, the instructions further cause the computing device to provide a value of a continuously running counter on the processor in response to each of the executed and re-executed time function instructions. In another example, the instructions further cause the computing device to utilize the provided counter value to generate a time stamp or generate a derived value. In another example, the prediction is performed by the processor.

A further example includes a computing device configured with a high-resolution timer, comprising: at least one processor having a continuously running counter, an instruction cache, and a branch predictor, the processor having a working state and one or more sleep states; and at least one non-transitory computer-readable storage media having computer-executable instructions stored thereon which, when executed by the least one processor, cause the computing device to perform successive calls to a time function that is instantiated on the computing device including an initial call followed by a subsequent call, the time function interfacing with the counter to retrieve current values of the counter; in response to the initial call to the time function, cache instructions associated with the time function in the instruction cache; attempt to optimize execution of the time function instructions by predicting an execution path of the time function instructions using the branch predictor; in response to the prediction, execute instructions for the time function to initially return the current value of the counter to the time function; and in response to the subsequent call to the time function, re-execute the time function instructions according to results of the prediction to subsequently return the current value of the counter to the time function, wherein the processor remains in the working state while re-executing the time function instructions.

In another example, the instructions further cause the computing device to cache data associated with the time function in a data cache associated with the processor. In another example, each of the initial and subsequent calls to the time function use the same cached data. In another example, the instructions further cause the computing device to expose an application programming interface (API) to enable the successive calls to be invoked from one or more applications that are operative on the computing device. In another example, the successive calls to the time function are placed from an application that is operative on the computing device and the time function is instantiated as an operating system function. In another example, the processor is configured to switch between working and sleep states in which the working state comprises a normal operating mode, and the sleep states comprise one or more energy-conserving C-modes. In another example, remaining in the working state comprises not entering a sleep state.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-implemented method comprising:

performing successive calls to a time function that is instantiated on a computing device including an initial call followed by a subsequent call, the time function interfacing with a continuously running counter instantiated as a hardware register, the continuously running counter running at an invariant rate and being a processor on the computing device to retrieve a current value of the continuously running counter, the processor including a processor pipeline and a data cache;

in response to the initial call to the time function, loading instructions associated with the time function in the processor pipeline and caching data associated with the time function in the data cache;

executing the instructions in the pipeline using the data in the data cache to initially return the current value of the continuously running counter to the time function; and in response to the subsequent call to the time function, re-executing the instructions in the pipeline and reusing the data in the data cache to subsequently return the current value of the continuously running counter to the time function.

2. The computer-implemented method of claim 1 further including generating a timestamp using the subsequently returned current value of the continuously running counter.

3. The computer-implemented method of claim 1 further including generating a derived value using the subsequently returned current value of the continuously running counter.

4. The computer-implemented method of claim 1 in which the processor has a working state and a sleep state, and in which the successive calls to the time function cause the processor to remain in a working state while re-executing the instructions and reusing the cached data to subsequently return the current value of the continuously running counter to the time function.

5. The computer-implemented method of claim 1 in which the processor applies predictive execution to optimize execution of the instructions in response to the initial call and uses results of the predictive execution for re-execution of the instructions in response to the subsequent call.

6. The computer-implemented method of claim 1 in which the processor pipeline is configured with stages comprising fetching, decoding, execution, and writing-back.

7. The computer-implemented method of claim 6 in which the processor pipeline is configured with predictive execution capabilities.

8. The computer-implemented method of claim 6 in which the processor comprises a multi-level instruction caches or multiple cores, wherein each of the multiple cores includes an individual continuously running counter, or the multiple cores commonly share a continuously running counter.

9. A hardware-based computer-readable memory device storing computer-executable instructions which, upon execution by a processor in a computing device, cause the computing device to:

operate a continuously running counter instantiated as a hardware register in the processor, the continuously running counter running at an invariant rate;

operate a pipeline on the processor;

operate a data cache on the processor;

place an initial call to a time function interfacing with the continuously running counter;

prime the pipeline by loading time function instructions into the pipeline in response to the initial call;

prime the data cache by storing data associated with the time function in the data cache in response to the initial call;

place a subsequent call to the time function in which the processor remains in a working state without transitioning to a sleep state when executing the time function from the subsequent call based on the pipeline and data cache each being respectively primed responsively to the initial call to the time function; and in response to execution of the time function from the subsequent call, obtain a value from the continuously running counter on the processor while the processor remains in the working state.

10. The hardware-based computer-readable memory device of claim 9 in which the initial and subsequent calls to the time function are implemented by an application feature.

11. The hardware-based computer-readable memory device of claim 9 in which the initial and subsequent calls to the time function are implemented by an operating system feature.

12. The hardware-based computer-readable memory device of claim 9 in which the instructions further cause the computing device to utilize the obtained counter value to generate a time stamp.

13. The hardware-based computer-readable memory device of claim 9 in which the instructions further cause the computing device to utilize the obtained counter value to generate a derived value.

14. A computing device, comprising:

a processor;

a data cache; and a hardware-based computer-readable storage medium having computer-executable instructions stored thereon which, when executed by the processor, cause the computing device to:

operate a continuously running counter instantiated as a hardware register in the processor, the continuously running counter running at an invariant rate;

operate a pipeline in the processor;

perform multiple calls to a time function that is instantiated on the computing device including an initial call followed by a subsequent call, the time function interfacing with the continuously running counter to retrieve current values of the continuously running counter;

in response to the initial call to the time function, prime the data cache with data;

execute the instructions in the pipeline using the data from the primed cache to initially return the current value of the continuously running counter to the time function; and in response to the subsequent call to the time function, reuse data from the primed cache to subsequently return the current value of the continuously running counter to the time function.

15. The computing device of claim 14 in which the instructions further cause the computing device to load instructions associated with the time function in the pipeline.

16. The computing device of claim 15 in which the instructions further cause the computing device to re-execute the instructions in the pipeline.

17. The computing device of claim 14 in which the instructions further cause the computing device to expose an application programming interface (API) to enable the multiple calls to be invoked from one or more applications that are operative on the computing device.

18. The computing device of claim 14 in which the multiple calls to the time function are placed from an application that is operative on the computing device and the time function is instantiated as an operating system function.

19. The computing device of claim 14 in which the processor is configured to switch between working and sleep states in which the working state comprises a normal operating mode, and the sleep states comprise one or more energy-conserving C-modes.

20. The computing device of claim 19 in which remaining in the working state comprises not entering a sleep state.

* * * * *